US008886546B2

(12) United States Patent
Ganapathy et al.

(10) Patent No.: US 8,886,546 B2
(45) Date of Patent: Nov. 11, 2014

(54) VOICE APPLICATION ACCESS

(75) Inventors: Giri Ganapathy, Chennai (IN);
Karthikeyan Gurusamy, Chennai (IN);
Balasundaram Nagarajan, Chennai (IN); Madhu Bommineni, Chennai (IN);
Mallikarjun Marupally, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 325 days.

(21) Appl. No.: 13/329,637

(22) Filed: Dec. 19, 2011

(65) Prior Publication Data
US 2013/0159002 A1 Jun. 20, 2013

(51) Int. Cl.
*G10L 21/00* (2013.01)
(52) U.S. Cl.
USPC ......... 704/275; 704/270.1; 704/231; 704/270
(58) Field of Classification Search
CPC ............................. G10L 15/22; G10L 15/265
USPC .................. 704/231, 270, 270.1, 275
See application file for complete search history.

(56) References Cited

U.S. PATENT DOCUMENTS

| | | | |
|---|---|---|---|
| 2008/0154611 A1* | 6/2008 | Evermann et al. ............ 704/275 |
| 2008/0221900 A1* | 9/2008 | Cerra et al. ................ 704/270.1 |
| 2009/0132487 A1* | 5/2009 | Lev .................................. 707/3 |
| 2009/0228281 A1* | 9/2009 | Singleton et al. ............ 704/275 |
| 2009/0298529 A1* | 12/2009 | Mahajan ................... 455/550.1 |
| 2010/0312547 A1* | 12/2010 | Van Os et al. ..................... 704/9 |
| 2011/0001699 A1* | 1/2011 | Jacobsen et al. .............. 345/157 |
| 2011/0014952 A1* | 1/2011 | Minton ........................ 455/566 |
| 2011/0069024 A1* | 3/2011 | Kim ........................ 345/173 |
| 2011/0091023 A1* | 4/2011 | Kurganov et al. ......... 379/88.17 |
| 2012/0127072 A1* | 5/2012 | Kim ............................ 345/156 |

* cited by examiner

*Primary Examiner* — Douglas Godblod

(57) ABSTRACT

A system may include a mobile computing device configured to receive voice input; identify, in the voice input, a navigate command including a sequence indication; determine, based on a sequence control map, a control of a user interface corresponding to the sequence indication; and activate the control of the user interface corresponding to the sequence indication.

21 Claims, 9 Drawing Sheets

US 8,886,546 B2

VOICE APPLICATION ACCESS

BACKGROUND

Devices include user interfaces to allow users to communicate with the devices. However, a typical user interface designed for a home device may not be suitable for use on a mobile device. Moreover, a user interface suitable for a stationary mobile user may be difficult for a user to operate while distracted or unable to view and touch the device.

DETAILED DESCRIPTION

With the advent of sophisticated mobile devices such as smart phones and tablets, desktop applications are being migrated to mobile applications suitable for mobile devices. In some instances these mobile applications are web-based applications or mobile applications available through an application store. A user may interact with such a mobile application through various user interface hardware of the mobile device. This hardware may be activated according to touch, and may include buttons, a hardware keyboard, and/or a touch screen. Using the user interface hardware, the user may select fields of the mobile application into which input is to be received and may enter content into the selected fields.

With help of voice recognition, these mobile applications may also be accessible through voice. A voice navigation module may be implemented on a mobile device to allow the user to verbally enter content into the controls of the user interface. For example, the voice control system may transcribe spoken user input and place the resultant content in the active control of the user interface. To allow for voice navigation of the controls of the user interface, the mobile device may further be configured to assign sequence indications to each control of the user interface, such that when a user speaks a sequence indication assigned to a control, the user interface activates the control associated with the spoken sequence indication. If the control to be activated is outside of the viewable area of the user interface, the voice navigation module may scroll the user interface or change the page of the user interface to move the active control into view.

The association of controls of the user interface with unique sequence indications may be stored as a sequence control map, and sequence control maps may be stored in a data store. As the sequencing of controls for a form or application may remain relatively constant, a user may readily memorize the sequencing of controls. In some examples, indications of the sequence control map may be displayed on the user interface to allow the user to review the sequencing of the user interface controls. Accordingly, through use of the voice navigation module, a user of a mobile device may be able to utilize a user interface without resorting to typing or switching the active user interface control by touch.

To facilitate explanation, the sequencing of controls discussed herein is described as being a numeric mapping. Nevertheless, the sequencing of controls is not limited to being numerical. For example, other systems of uniquely sequencing the controls may be used, such as by way of alphabetic designations, alphanumeric designations, or any other arbitrary sequencing scheme.

Figure 1:
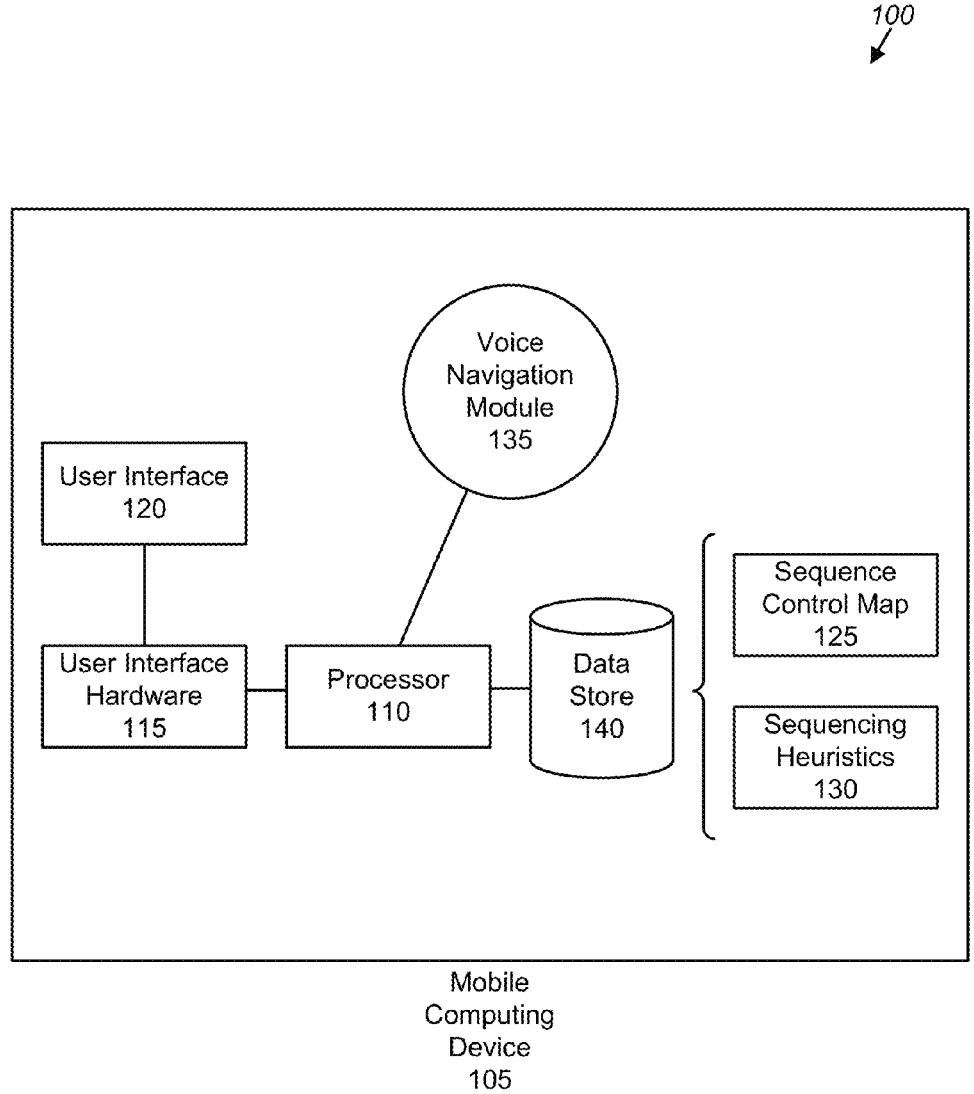
FIG. 1 illustrates an exemplary mobile computing device configured to provide navigation of a user interface according to a sequence control map by employing a voice navigation module.

FIG. 1 illustrates a system 100 including an exemplary mobile computing device 105 configured to provide navigation of a user interface 120 according to a sequence control map 125 by employing a voice navigation module 135. The mobile computing device 105 may be any of various types of devices, such as a mobile telephone, a pager, a tablet computer, a portable music player, a vehicle computing device, among other examples. The mobile computing device 105 may be implemented as a combination of hardware and software, and may include one or more software applications or processes for causing one or more computer processors 110 to perform the operations of the mobile computing device 105 described herein.

The mobile computing device 105 may include user interface hardware 115 capable of receiving input from a user and providing output to the user. The user interface hardware 115 components may allow for the operation and control of the functions of the mobile computing device 105. The user interface hardware 115 may further provide feedback and other output to the user to aid the user in making operational decisions with respect to the mobile computing device 105. Exemplary user interface hardware 115 may include keyboards, buttons, microphones, display screens, touch screens and loudspeakers.

The user interface hardware 115 may be used to provide a user interface 120. In some cases the user interface 120 may be visual, and may be provided visually such as on a screen. In other cases the user interface 120 may be audio-based, and may be provided audibly such as by a sound reproduction device. The user interface hardware 115 may also be used to receive user interface 120 input. In some cases, the user interface 120 may receive physical input, such as by way of keyboards, buttons, or touch screens. In other cases, the user interface 120 may receive audio input, such as from a microphone or other sound receiving device.

A sequence is an ordered set or list of items. A sequence may be determined for each of the controls of a user interface 120. A sequence control map 125 may include a mapping of the controls of the user interface 120 to unique designations representing the location of the control in the sequence. For example, each control of a web form that may receive focus or that may accept user input may be assigned a unique letter or number corresponding to an element in the sequence control map 125. In some instances, the sequence control map 125 may include a mapping of controls of a single form. In other examples, multiple related user interface forms, or even all the forms of an application may be included in a single sequence control map 125. Sequence control maps 125 may be stored for multiple accesses of the same form or application, providing consistency with the sequencing of user interface controls.

A set of sequencing heuristics 130 may be utilized to determine aspects of the sequence control map 125. These aspects may include how to map the user interface controls of the user interface 120, whether or not to include related forms in the same sequence control map 125, how to determine whether forms are related, as well as in what order to sequence the user interface controls of the user interface 120. For example, sequencing heuristics 130 may indicate in which direction user interface controls may be sequenced, such as a combination of one or more of: (i) from left to right in the order the controls appear in the form, (ii) from right to left in the order the controls appear in the form, (iii) from top to bottom in the order the controls appear in the form, and (iv) from bottom to top in the order the controls appear in the form, and (v) in the tab or focus order the controls appear in the form. As another example, sequencing heuristics 130 may indicate whether to indicate the sequencing of controls using numerals, alphabetic characters, or some other recognizable sequence of designations.

The mobile computing device 105 may include a voice navigation module 135. The voice navigation module 135 may be provided as software that when executed by the processor 110 provides the operations described herein. Alternatively, the voice navigation module 135 may be provided as hardware or firmware, or combinations of software, hardware and/or firmware. As explained in detail below, the voice navigation module 135 may be configured to generate a sequence control map 125 of a user interface 120 and utilize the sequence control map 125 to allow a user to navigate the user interface 120.

The data store 140 may include one or more data storage mediums, devices, or configurations, and may employ various types, forms, and/or combinations of storage media, including but not limited to hard disk drives, flash drives, read-only memory, and random access memory. The data store 140 may include various technologies useful for storing and accessing any suitable type or form of electronic data, which may be referred to as content. Content may include computer-readable data in any form, including, but not limited to video, image, text, document, audio, audiovisual, metadata, and other types of files or data. Content may be stored in a relational format, such as via a relational database management system (RDBMS). As another example, content may be stored in a hierarchical or flat file system. As yet another example, content may be stored in the form of extensible markup language (XML) files.

Exemplary data that may be stored in the data store 140 include one or more sequence control maps 125 and one or more sets of sequencing heuristics 130, among other types. In some cases, a sequence control map 125 is stored in the data store 140 in association with an identifier of a corresponding form or application for which the sequence control map 125 is applicable. Identifiers may be formed by various mechanisms, such as by web page name, application name, or hash value computed based on an enumeration of the controls of the form or application. By using the identifier of the corresponding form or application, the sequence control map 125 may be queried, stored, and retrieved from the data store 140

In general, computing systems and/or devices, such as mobile computing devices 105, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as mobile computing devices 105 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 110 or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor 110 of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor 110 of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as data store 140, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The voice navigation module 135 may be one such computer program product.

Figure 2:
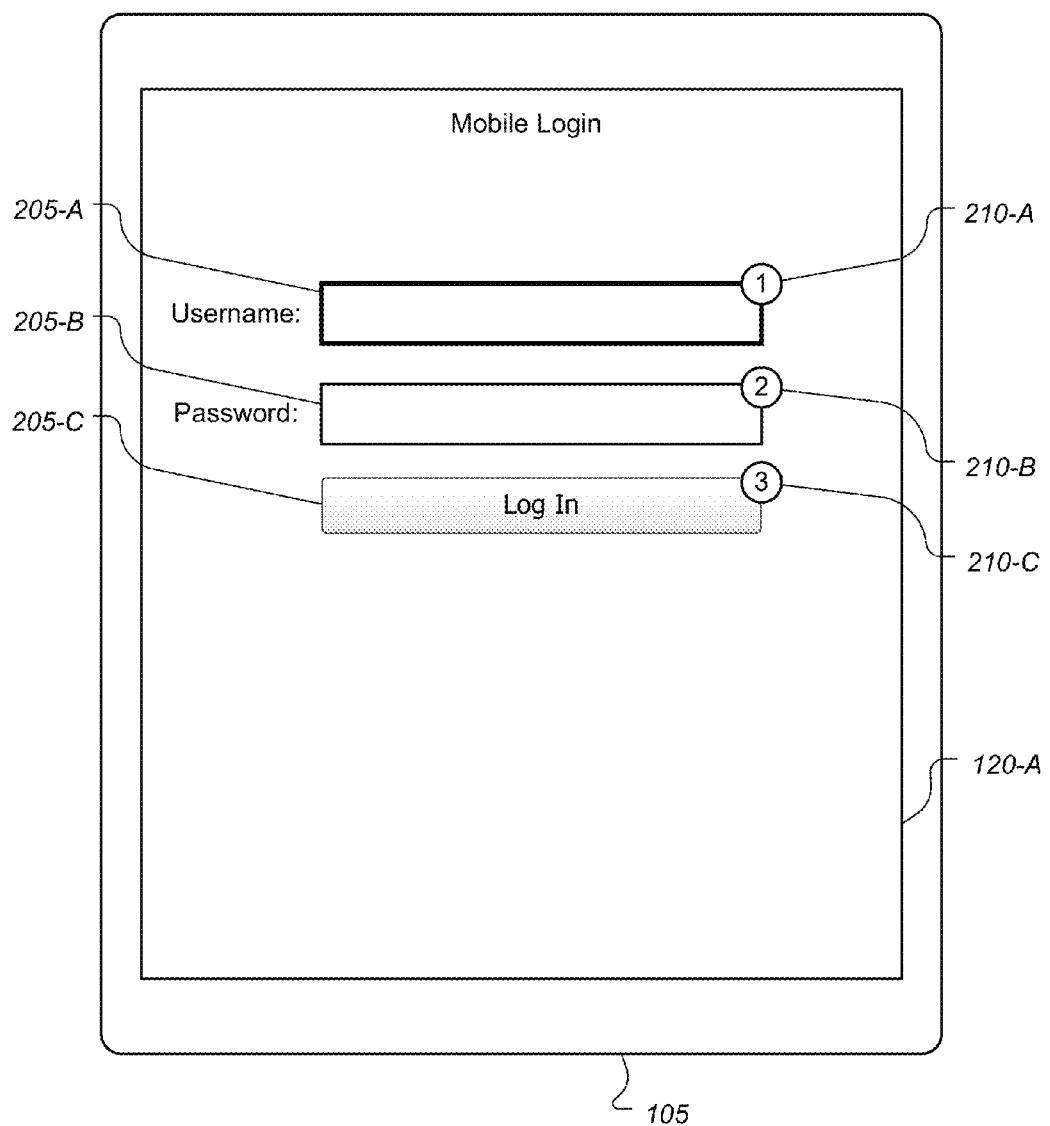
FIG. 2 illustrates an exemplary user interface of a mobile computing device having a plurality of controls mapped according to a sequence control map.

FIG. 2 illustrates an exemplary user interface 120-A of a mobile computing device 105 having a plurality of user interface controls 205 mapped according to a sequence control map 125. Each control 205-A through 205-C may be displayed accompanied by a corresponding sequence indication 210-A through 210-C determined according to the sequence control map 125. While the sequence indications 210 are illustrated as being visible in the user interface 120-A, sequence indications 210 may be selectively shown or hidden by the user.

As shown in the user interface 120-A, the sequence control map 125 may be generated using sequencing heuristics 130 that identify the controls 205 of the user interface 120 from top to bottom. Using the exemplary sequencing heuristics 130, the "Username" user interface control 205-A is sequenced first, followed by the "Password" user interface control 205-B sequenced second, followed by the "Log In" user interface control 205-C sequenced third.

A user may specify which control 205 of the user interface 120-A to make active by providing a navigate command to the mobile computing device 105. Initially as shown, the "Username" user interface control 205-A is presently the active control 205 of the user interface 120. If the user desires to make the "Password" control 205-B active, the user may do so by speaking a navigate command. For example, the user may say "GO TO CONTROL NUMBER 2," or simply speak the sequence indication "2." The mobile computing device 105 may receive the spoken command using the user interface hardware 115, and based on the sequence control map 125 may make the password control 205-B the active control 205 of the user interface 120-A.

In some examples, the mobile computing device 105 may infer from context that the single spoken sequence indication indicates a navigate command. In still other examples, the mobile computing device 105 may determine that a spoken sequence indication is a navigate command based on the user performing an additional action or inaction, such as pressing a certain button on the mobile computing device 105 indicative of navigation input, speaking a command to switch between data entry and navigation modes, or based on a period of inactivity preceding the voice input.

Figure 3:
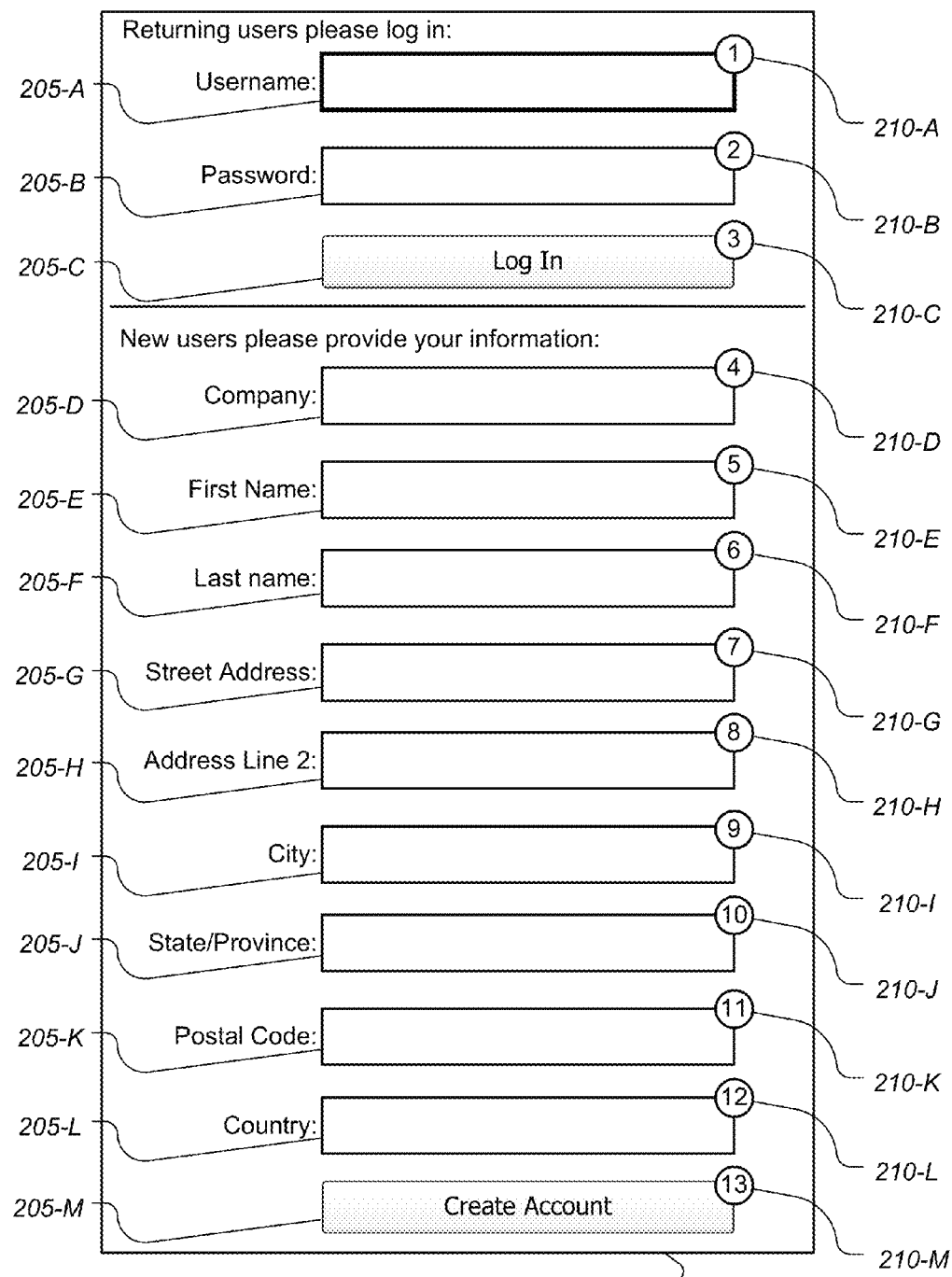
FIG. 3 illustrates an exemplary user interface having a relatively large number of controls.

FIG. 3 illustrates an exemplary user interface 120-B having a relatively large number of user interface controls 205. Each user interface control 205-A through 205-M is illustrated with a corresponding sequence indication 210-A through 210-M determined according to a corresponding sequence control map 125. Notably, the user interface 120-B may be too large to be effectively displayed all at once by the user interface hardware 115 of the mobile computing device 105.

Figure 4:
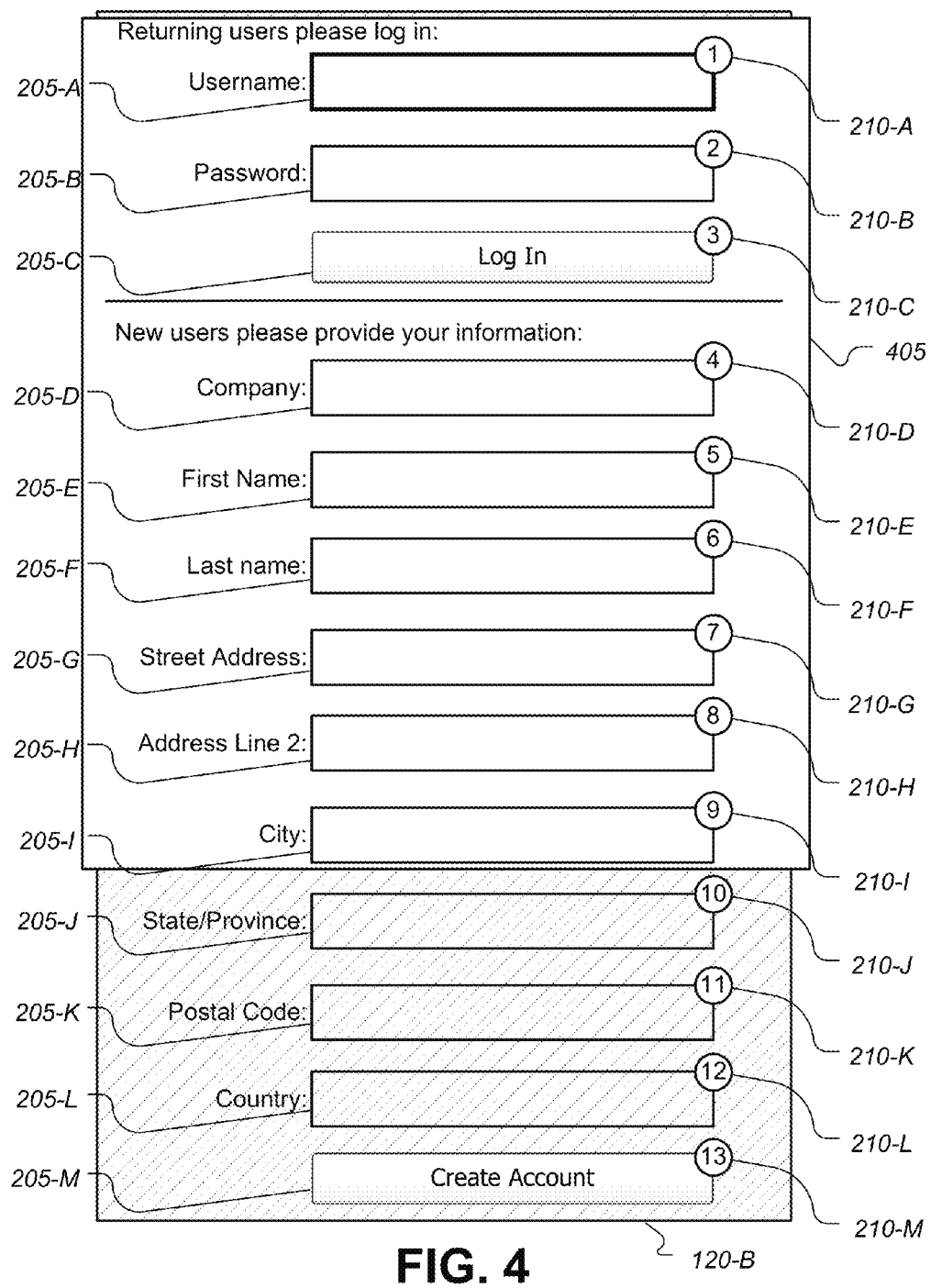
FIG. 4 illustrates an exemplary user interface wherein only a portion of the controls are displayed within a viewable area of the user interface.

FIG. 4 illustrates an exemplary user interface 120-B wherein only a portion of the user interface controls 205-A through 205-M are displayed within a viewable area 405 of the user interface 120. As shown, only controls 205-A through 205-I are displayed within the user interface 120-B. Controls 205-J through 205-M fall outside the viewable area 405 of the user interface 120-B and are not visible.

While the controls 205-J through 205-M are not visible, these controls may be accessible by a user. For example, the user may manually scroll the user interface 120. Or, the mobile computing device 105 may receive a navigate command requesting to make a control 205 active, and as part of making the control 205 active the mobile computing device 105 may ensure that the active control 205 is visible.

As a more specific example, the mobile computing device 105 may receive a navigate command requesting to make control 205 sequence indication "11" active. The mobile computing device 105 may determine, based on the corresponding sequence control map 125 for the form, that the "Postal Code" control 205-K should be activated. Because the control 205-K is not presently being displayed within the viewable area 405 of the user interface 120-B, the mobile computing device 105 may scroll the user interface 120-C to move the control 205-K to within the viewable area 405.

Figure 5:
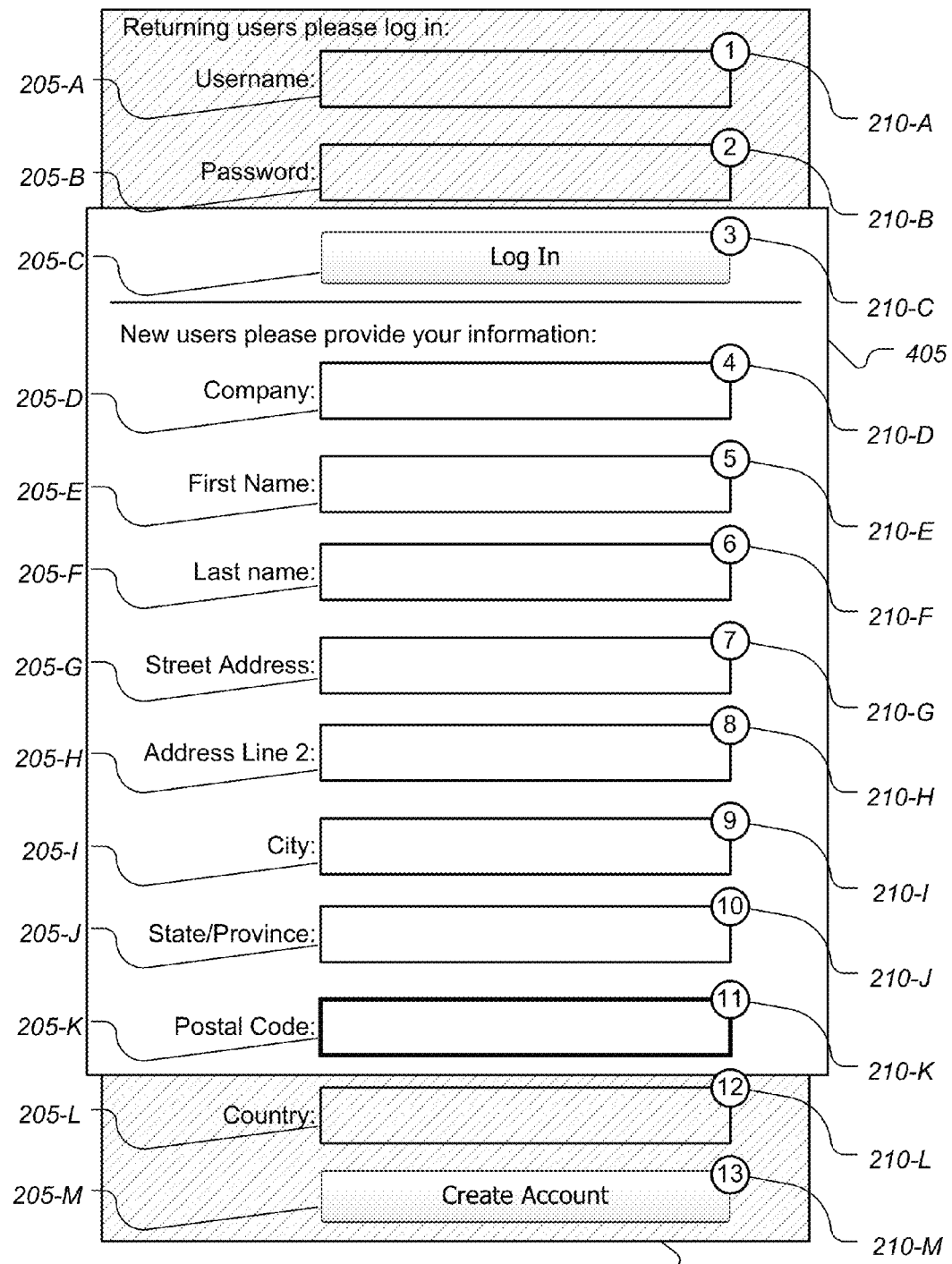
FIG. 5 illustrates an exemplary user interface illustrating the scrolling of the user interface to move a control to be within the viewable area of the user interface.

FIG. 5 illustrates an exemplary user interface 120-B illustrating the scrolling of the user interface 120 to move the control 205-K to be within the viewable area 405 of the user interface 120. Continuing with the example of FIG. 4, FIG. 5 illustrates the user interface 120-B after making the control 205-K active and after scrolling the viewable area 405 to include the control 205-K.

Figure 6:
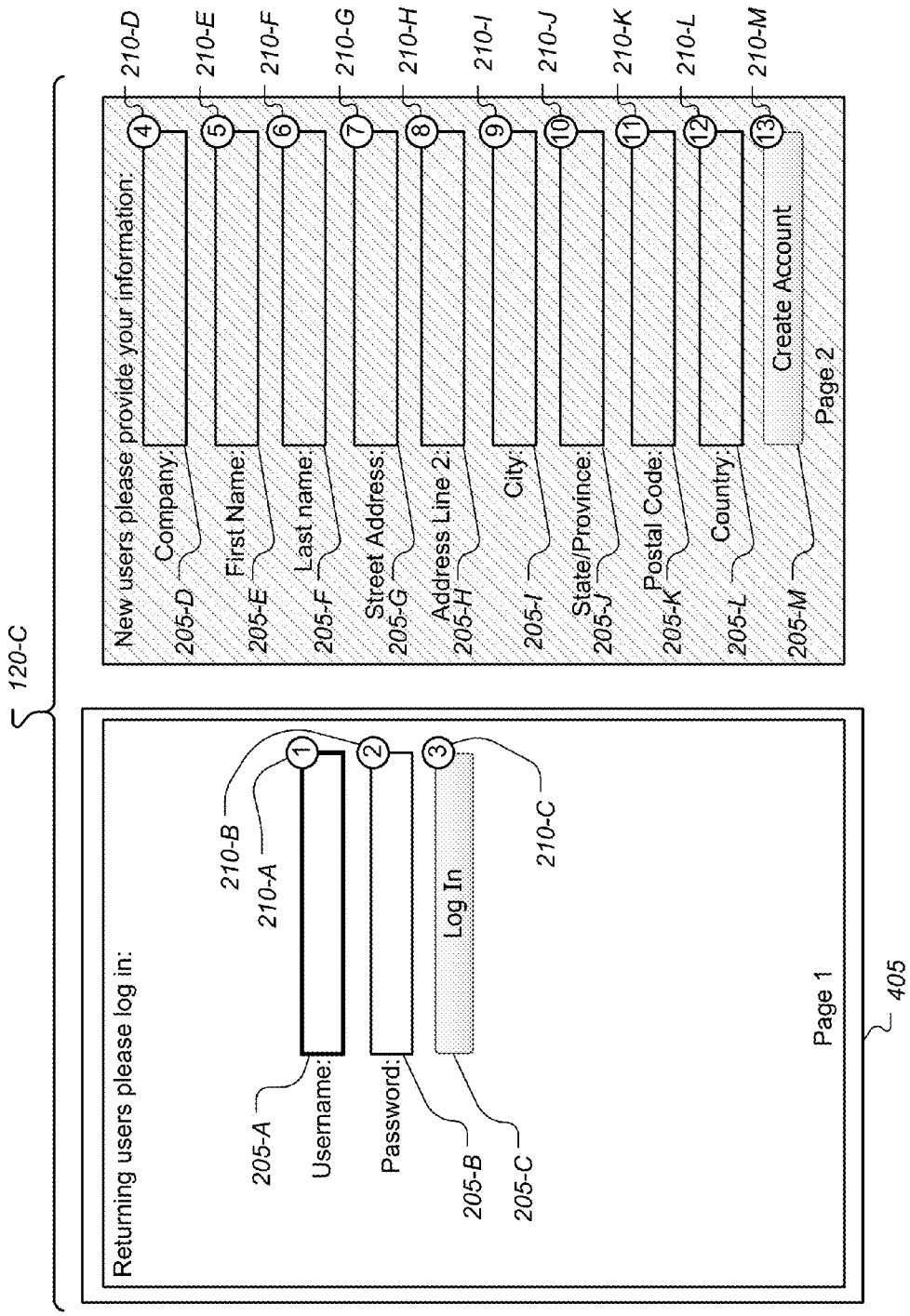
FIG. 6 illustrates an exemplary user interface having multiple forms.

FIG. 6 illustrates an exemplary user interface 120-C having multiple forms. As shown in the user interface 120-C, controls 205-A through 205-C are displayable within a first form of the user interface 120-C, while controls 205-D through 205-M are displayable on a second form of the user interface 120-C.

While the controls 205-D through 205-M are not visible, these controls may be accessible by a user, such as by way of navigate commands received by the mobile computing device 105. For example, the mobile computing device 105 may receive a navigate command requesting to make control 205 sequence indication "11" active. The mobile computing device 105 may determine based on the sequence control map 125 that the second form should be displayed, as the second form includes "Postal Code" control 205-K.

Figure 7:
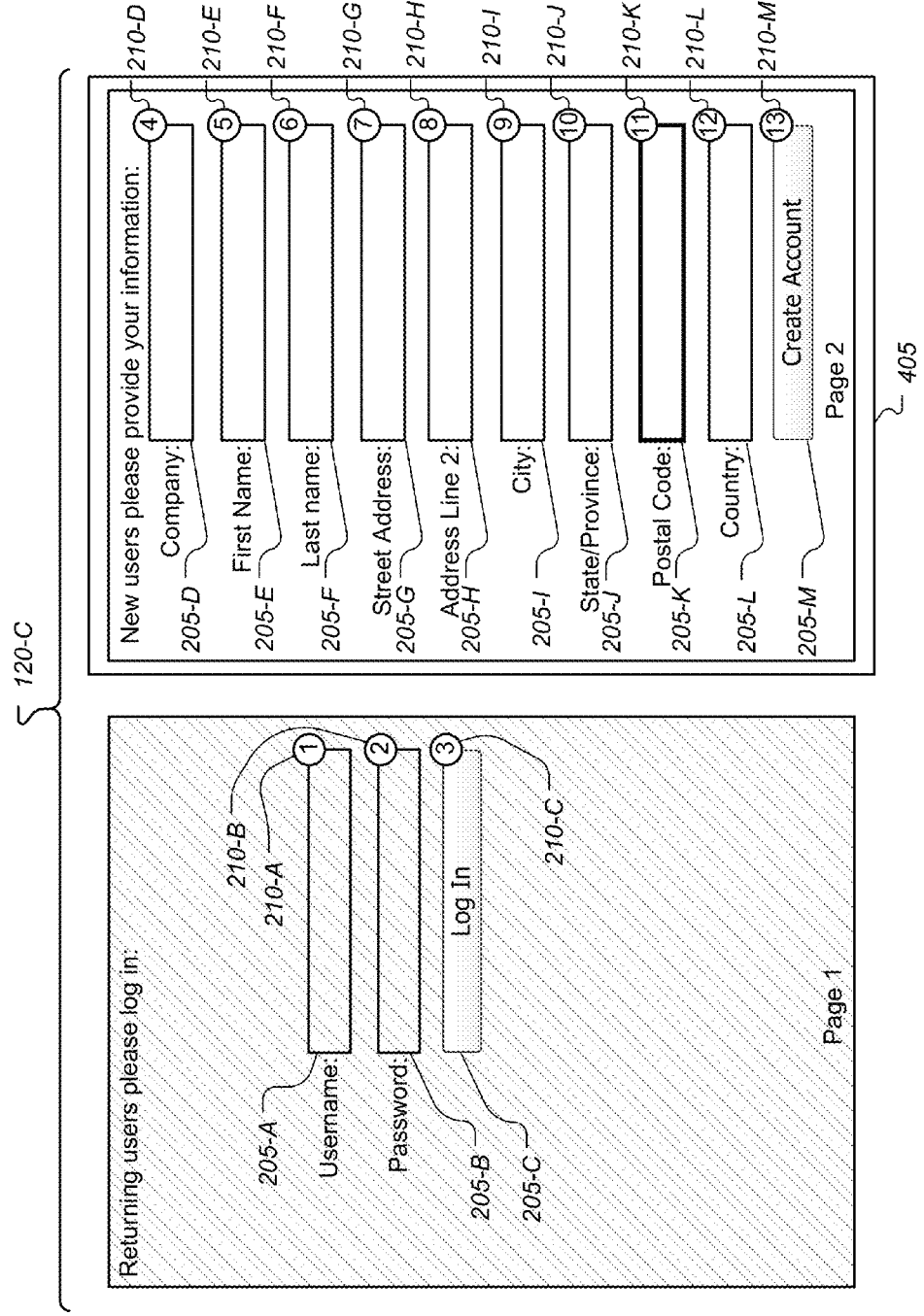
FIG. 7 illustrates an exemplary user interface illustrating the switching of forms of the user interface to move a control within the viewable area of the user interface.

FIG. 7 illustrates an exemplary user interface 120-C illustrating the switching of forms of the user interface 120 to move the control 205-K within the viewable area 405 of the user interface. Continuing with the example of FIG. 6, FIG. 7 illustrates the user interface 120-C after making the second form active based on receiving the navigate command requesting to make control sequence indication "11" active. Accordingly, the control sequenced "11" is now visible and available for further user input, such as to receive content from the user of the mobile computing device 105.

Figure 8:
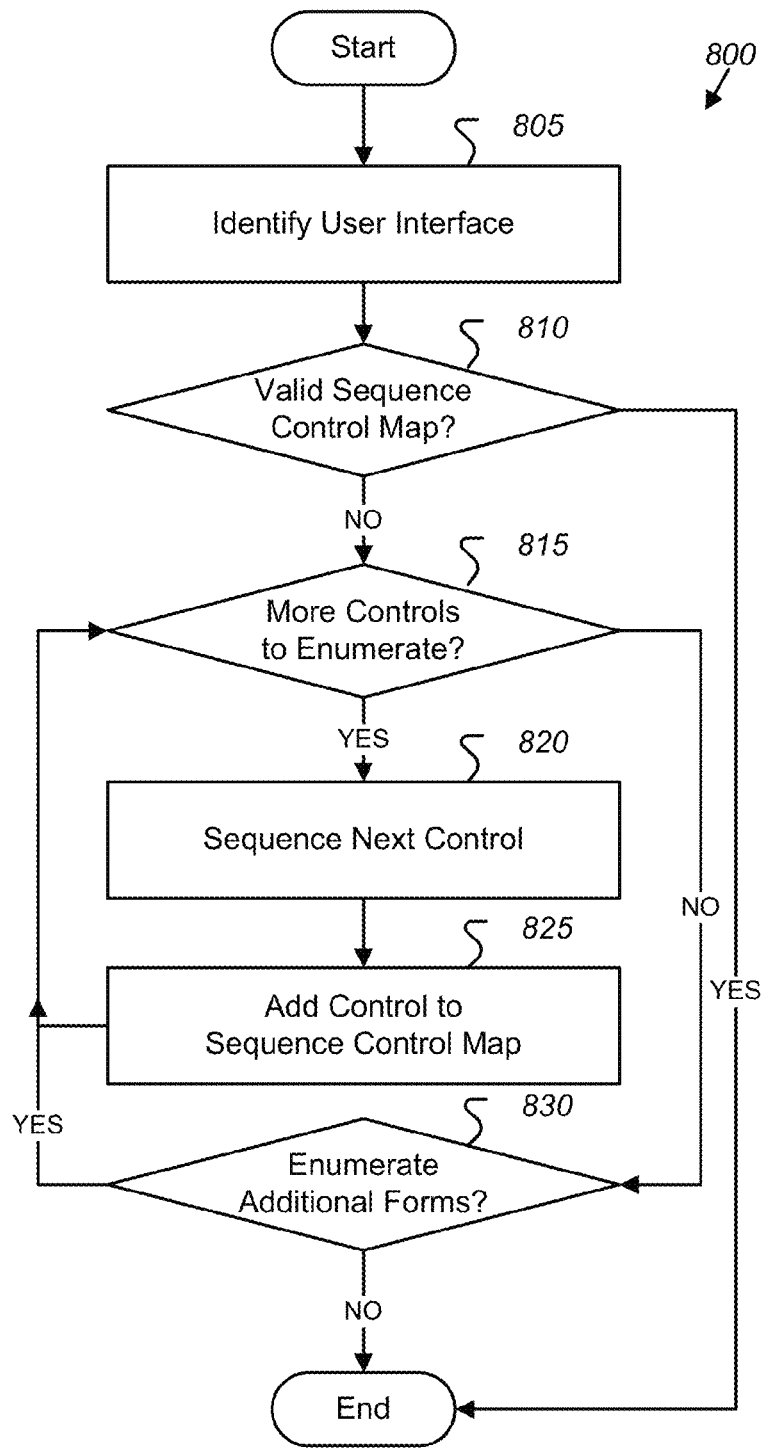
FIG. 8 illustrates an exemplary process for creating a sequence control map.

FIG. 8 illustrates an exemplary process 800 for creating a sequence control map 125. The process 800 may be performed by various devices, such as by a mobile computing device 105 executing instructions of a voice navigation module 135 using a processor 110.

In block 805, the mobile computing device 105 identifies a user interface 120 being displayed by the mobile computing device 105. For example, a user of the mobile computing device 105 may have navigated to a form or may have opened an application on the mobile computing device 105. As another example, a notification or new message may have caused the mobile computing device 105 to display a particular form or application. Based on the displayed user interface 120, the mobile computing device 105 may determine an identifier of the form or application, such as a web page name, application name, or hash value computed based on an enumeration of the controls 205 of the form or application.

In decision point 810, the mobile computing device 105 determines whether a valid sequence control map 125 exists for the identifier. For example, the mobile computing device 105 may perform a lookup of the identified user interface identifier in a data store 140 of the mobile computing device 105 in which sequence control maps 125 are maintained. If the data store 140 does not include an associated sequence control map 125, then the mobile computing device 105 may identify that creation of a sequence control map 125 is required. If a valid associated sequence control map 125 is located, then the sequence control map 125 may be retrieved and process 800 ends. Otherwise, control passes to block 815.

In block 815, the mobile computing device 105 determines whether there are additional controls 205 of the user interface 120 to be sequenced. For example, the mobile computing device 105 may determine whether the user interface 120 includes any additional controls 205 that may accept user input and should therefore be included in the sequence control map 125. The mobile computing device 105 may utilize the sequencing heuristics 130 to determine whether all controls 205 have been sequenced and in the required order or if any controls 205 remain to be sequenced. If the mobile computing device 105 determines there are additional controls 205 of the user interface 120 to be sequenced, control passes to block 820. Otherwise control passes to block 830.

In block 820, the mobile computing device 105 sequences the next control 205. For example, the mobile computing device 105 may determine a next sequence designation based on the sequencing heuristics 130. The mobile computing device 105 may further associate the determined sequence designation with the control 205 of the user interface 120.

In block 825, the mobile computing device 105 adds the association of the sequence indication with the control 205 of the user interface 120 to the sequence control map 125. For example, each association of an sequence designation with a control 205 of the user interface 120 may be stored as a row of the sequence control map 125 in a database table stored in the data store 140.

In block 830, the mobile computing device 105 determines whether additional forms of the user interface 120 should be sequenced into the same sequence control map 125. For example, the mobile computing device 105 may determine that an application includes multiple forms. If so, the mobile computing device 105 may further determine to include sequencing of each of the forms of the application into the same sequence control map 125. If the mobile computing device 105 determines that additional forms of the user interface 120 exist and should be sequenced into the sequence control map 125, control passes to block 815. Otherwise, the process 800 ends.

Figure 9:
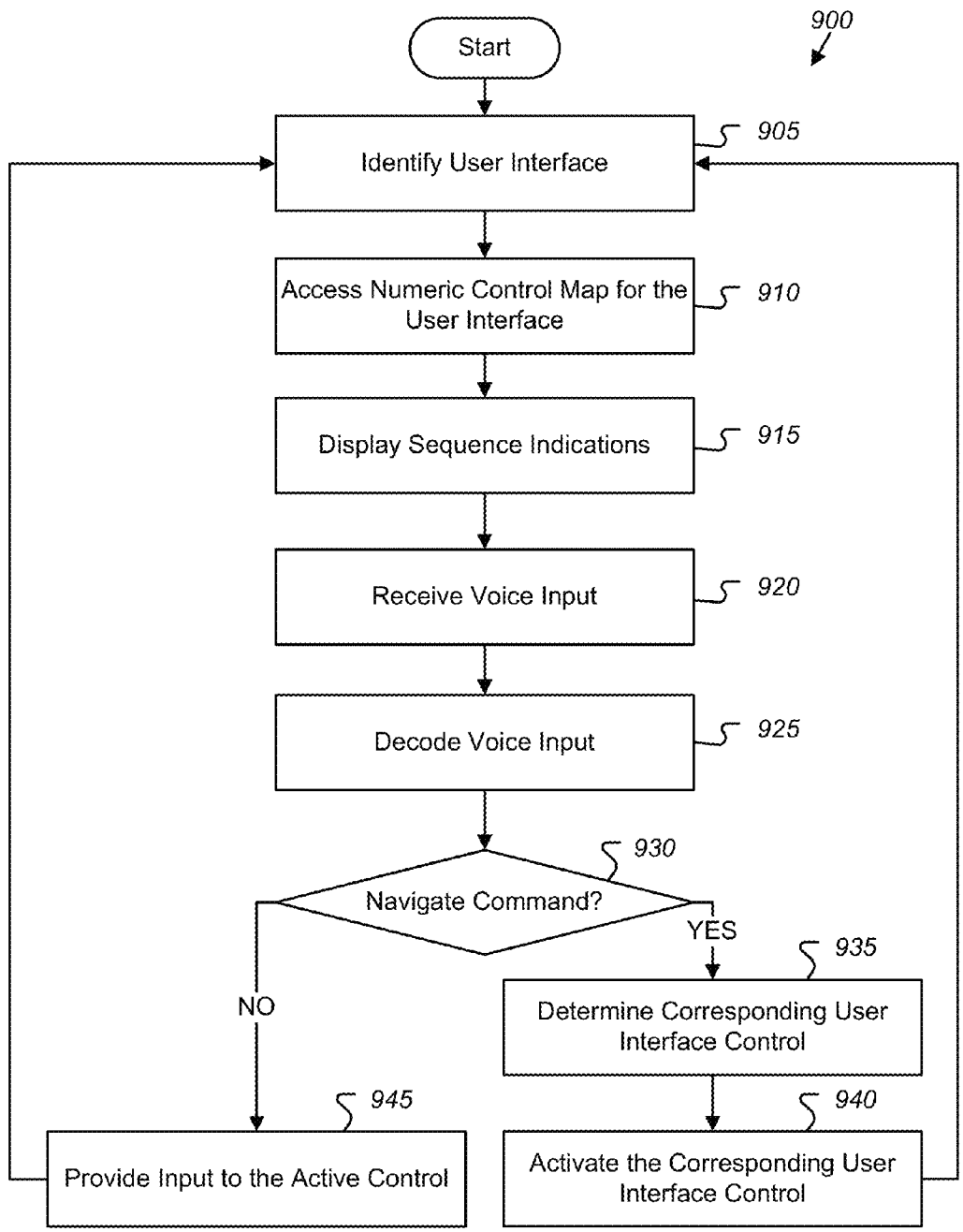
FIG. 9 illustrates an exemplary process for utilizing a sequence control map to navigate a user interface.

FIG. 9 illustrates an exemplary process 900 for utilizing a sequence control map 125 to navigate a user interface 120. Similar to the process 800, the process 900 may be performed by various devices, such as by a mobile computing device 105 executing instructions of a voice navigation module 135 using a processor 110.

In block 905, the mobile computing device 105 identifies a user interface 120 being displayed by the mobile computing device 105. For example, a user of the mobile computing device 105 may have navigated to a form or may have opened an application on the mobile computing device 105. As another example, a notification or new message may have caused the mobile computing device 105 to display a particular form or application. Based on the displayed user interface 120, the mobile computing device 105 may determine an identifier of the form or application, such as a web page name, application name, or hash value computed based on an enumeration of the controls 205 of the form or application.

In block 910, the mobile computing device 105 accesses a sequence control map 125 associated with the user interface 120 being presented. For example, the mobile computing device 105 may query a data store 140 for a sequence control map 125 based on the identifier of a form or application presently being displayed by the user interface 120. The data store 140 may accordingly return the sequence control map 125, if available. If the data store 140 does not include a corresponding sequence control map 125, then the mobile computing device 105 may create the sequence control map 125 using a process such as the process 800 discussed above with respect to FIG. 8.

In block 915, the mobile computing device 105 displays sequence indications 210. For example, based on the sequence control map 125 the mobile computing device 105 may display sequence indications 210 along with the controls 205 of the user interface 120.

In block 920, the mobile computing device 105 receives voice input. For example, the mobile computing device 105 may receive voice input from the user interface hardware 115, such as from a microphone included in the mobile computing device 105.

In block 925, the mobile computing device 105 decodes the received voice input. For example, the mobile computing device 105 may perform voice recognition on the received voice input to decode the input into text. As another example, the mobile computing device 105 may send the received voice input to a remote device to be recognized, and may receive the resultant decoded text from the remote device.

In decision point 930, the mobile computing device 105 determines whether the decoded text includes a navigate command. For example, the decoded text may include a navigate command in a form recognizable by the mobile computing device 105, such as "GO TO CONTROL NUMBER X," where "X" is a sequence indication of a control 205 included in the sequence control map 125. In other examples, the decoded text may include the sequence indication 210 directly, such as "X," and the mobile computing device 105 may infer from context that the sequence indication 210 indicates a navigate command. In still other examples, the mobile computing device 105 may determine that a spoken sequence indication 210 is a navigate command based on the user performing an additional action or inaction, such as pressing a certain button on the mobile computing device 105 indicative of navigation input, speaking a command to switch between data entry and navigation modes, or by inferring the sequence indication 210 is a navigation command based on a preceding period of inactivity. If the mobile computing device 105 determines that the received voice input includes a navigate command, control passes to block 935. Otherwise control passes to block 945.

In block 935, the mobile computing device 105 determines a control 205 of the user interface 120 corresponding to the decoded text of the navigate command. For example, the mobile computing device 105 may determine the corresponding control 205 according to the sequence control map 125 for the user interface 120.

In block 940, the mobile computing device 105 activates the corresponding control 205 of the user interface 120. For example, the mobile computing device 105 may set focus to the corresponding control 205. By activating the control 205, the control 205 therefore becomes available to receive content. In some cases, the control 205 may be scrolled outside of the viewable area 405 of the user interface 120. In these cases, the mobile computing device 105 may adjust the user interface 120 by scrolling the active control 205 to within the viewable area 405. In other cases, the control 205 may be present on a different form than the active form. In these other cases, the mobile computing device 105 may switch the viewable area 405 of the user interface 120 to the different form. After block 925, control passes to block 905.

In block 945, the mobile computing device 105 provides the input to the active control 205. For example, the mobile computing device 105 may place the corresponding textual content decoded from the received voice input into the control 205 of the user interface 120 that is currently in focus. After block 940, control passes to block 905.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a mobile computing device configured to:
   receive voice input;
   identify, in the voice input, a navigate command including a sequence indication having an order associated with a sequence control map;
   determine, based on the sequence control map, a control of a user interface corresponding to the sequence indication;
   activate the control of the user interface corresponding to the sequence indication;
   determine that the activated control is outside of a viewable area of the user interface; and
   automatically adjust the user interface to place the activated control within the viewable area.

2. The system of claim 1, wherein the mobile computing device is further configured to: identify the user interface; access the sequence control map for the identified user interface; and display sequence indications in the user interface according to the sequence control map.

3. The system of claim 1, wherein the mobile computing device is further configured to at least one of scroll the user interface and change a page of the user interface to adjust the user interface to place the activated control within the viewable area.

4. The system of claim 1, wherein the mobile computing device is further configured to: receive content to place in the activated control; and place the content in the activated control.

5. The system of claim 1, wherein the user interface includes a web page.

6. The system of claim 1, wherein the mobile computing device is further configured to:
   identify the user interface;
   determine whether a valid sequence control map exists for the identified user interface;
   retrieve the sequence control map from a data store if a valid sequence control map exists for the identified user interface; and
   create the sequence control map if no valid sequence control map exists for the identified user interface.

7. The system of claim 6, wherein the mobile computing device is further configured to map multiple forms of an application within the sequence control map.

8. The system of claim 1, wherein the mobile computing device is further configured to create the sequence control map according to a set of sequencing heuristics of the mobile device.

9. The system of claim 1, wherein the sequence control map comprises a plurality of controls each respectively associated with a unique sequence indicator from a plurality of sequence indicators, and wherein the sequence indication is one of the plurality of sequence that are configured to be shown as part of the user interface.

10. A method, comprising:
    receiving voice input;
    identifying, in the voice input by a mobile computing device, a navigate command including a sequence indication having an order associated with a sequence control map;
    accessing the sequence control map to determine, by the mobile computing device, a control of a user interface corresponding to the sequence indication;
    activating the control of the user interface corresponding to the sequence indication;
    determining that the activated control is outside of a viewable area of the user interface; and
    automatically adjusting the user interface to place the activated control within the viewable area.

11. The method of claim 10, further comprising:
    identifying the user interface;
    accessing the sequence control map for the identified user interface; and
    displaying sequence indications in the user interface according to the sequence control map.

12. The method of claim 10, further comprising at least one of scrolling the user interface and changing a page of the user interface for adjusting the user interface to place the activated control within the viewable area.

13. The method of claim 10, further comprising:
    identifying the user interface;
    determining whether a valid sequence control map exists for the identified user interface;
    retrieving the sequence control map from a data store if a valid sequence control map exists for the identified user interface; and
    creating the sequence control map if no valid sequence control map exists for the identified user interface.

14. The method of claim 13, further comprising mapping multiple forms of an application within the sequence control map.

15. The method of claim 10, further comprising creating the sequence control map according to a set of sequencing heuristics of the mobile computing device.

16. A non-transitory computer readable medium storing a software program, the software program being executable to provide operations comprising:
 receiving voice input;
 identifying, in the voice input, a navigate command including a sequence indication having an order associated with a sequence control map;
 accessing a sequence control map to determine a control of a user interface corresponding to the sequence indication;
 activating the control of the user interface corresponding to the sequence indication;
 determining that the activated control is outside of a viewable area of the user interface; and
 automatically adjusting the user interface to place the activated control within the viewable area.

17. The non-transitory computer readable medium of claim 16, further providing operations comprising: identifying the user interface; accessing the sequence control map for the identified user interface; and displaying sequence indications in the user interface according to the sequence control map.

18. The non-transitory computer readable medium of claim 16, further providing operations comprising at least one of scrolling the user interface and changing a page of the user interface for adjusting the user interface to place the activated control within the viewable area.

19. The non-transitory computer readable medium of claim 16, further providing operations comprising:
 identifying the user interface;
 determining whether a valid sequence control map exists for the identified user interface;
 retrieving the sequence control map from a data store if a valid sequence control map exists for the identified user interface; and
 creating the sequence control map if no valid sequence control map exists for the identified user interface.

20. The non-transitory computer readable medium of claim 19, further comprising sequencing multiple forms of an application within the sequence control map.

21. The non-transitory computer readable medium of claim 16, further providing operations comprising creating the sequence control map according to a set of sequencing heuristics of the mobile computing device.

* * * * *